(12) United States Patent
Yamada

(10) Patent No.: US 7,884,898 B2
(45) Date of Patent: Feb. 8, 2011

(54) OPTICAL SHEET FOR BACKLIGHT, BACKLIGHT, AND DISPLAY DEVICE

(75) Inventor: Yukinori Yamada, Ibaraki (JP)

(73) Assignee: Hitachi Maxwell, Ltd., Ibaraki-shi, Osaka (JP)

( * ) Notice: Subject to any disclaimer, the term of this patent is extended or adjusted under 35 U.S.C. 154(b) by 301 days.

(21) Appl. No.: 12/066,814

(22) PCT Filed: Nov. 28, 2006

(86) PCT No.: PCT/JP2006/323735

§ 371 (c)(1),
(2), (4) Date: Mar. 13, 2008

(87) PCT Pub. No.: WO2007/063856

PCT Pub. Date: Jun. 7, 2007

(65) Prior Publication Data

US 2009/0268128 A1    Oct. 29, 2009

(51) Int. Cl.
*G02F 1/1335* (2006.01)
(52) U.S. Cl. ...................................... 349/67
(58) Field of Classification Search ............ 349/67
See application file for complete search history.

(56) References Cited

U.S. PATENT DOCUMENTS 4,805,984 A    2/1989   Cobb, Jr.
7,176,995 B2 *  2/2007   Jang et al. .................. 349/113

FOREIGN PATENT DOCUMENTS

| EP | 1 217 426 A1 | 6/2002 |
|---|---|---|
| JP | 7-281181 A | 10/1995 |
| JP | 3262230 B2 | 12/2001 |
| WO | WO 02/03136 A1 | 1/2002 |

\* cited by examiner

*Primary Examiner*—Sung H Pak
(74) *Attorney, Agent, or Firm*—Birch, Stewart, Kolasch, Birch, LLP

(57) ABSTRACT

An optical sheet for a backlight is provided on a surface light source in the backlight. An optical reflection layer has a plurality of through grooves formed on a transparent substrate and arranged at a prescribed interval. The width of the through hole is narrowed from the upper surface opening to the lower surface opening. Each of the cylindrical lenses is filled within a corresponding through groove, and its surface is a cylindrical surface that covers the upper surface opening of the through groove. Light from the light source comes in only from the lower surface opening, so that the angle of incidence of light when the light reaches the cylindrical surface can be controlled, and an increased amount of light deflected toward the front surface can be emitted. Therefore, the optical sheet for a backlight can collect light from the surface light source in the front surface direction.

6 Claims, 16 Drawing Sheets

OPTICAL SHEET FOR BACKLIGHT, BACKLIGHT, AND DISPLAY DEVICE

TECHNICAL FIELD

The present invention relates to an optical sheet for a backlight, and a backlight and a display device using the optical sheet, and more specifically to an optical sheet for a backlight that deflects light from a surface light source in the front surface direction, and a backlight and a display device using the optical sheet.

BACKGROUND ART

In the field of display devices such as a liquid crystal display, there is a demand for improved front side brightness. Therefore, in a backlight device for use in such a display, an optical member used to control the angular distribution of brightness and improve the front side brightness is provided. As disclosed by JP 3262230 B, a prism sheet is generally used as such an optical member.

As shown in FIG. 24, the prism sheet 100 has a plurality of prisms PL arranged in parallel to one another. Diffused light R100 from a surface light source is refracted at the side plane BP0 of a prism PL and emitted as it is deflected to the front surface direction. In this way, the prism sheet 100 improves the front side brightness of the display by deflecting the diffused light to the front surface direction.

However, the prism sheet 100 can improve the front side brightness while it also raises the brightness in the front side oblique direction. FIG. 25 shows the angular distribution of brightness for the vertical viewing angle in the prism sheet 100 having the prisms PL arranged in parallel in the vertical direction of the display screen. With reference to FIG. 25, the relative brightness is raised for vertical viewing angles in the range of ±30° using the prism sheet 100, while so-called side lobes whose relative brightness values peak around viewing angles of 80° and −80° in oblique directions to the front surface are also generated. Therefore, light that forms the side lobes (hereinafter referred to as "side lobe light") does not contribute to improvement of the front side brightness. The prism sheet 100 cannot sufficiently collect outgoing light in the front surface direction and cannot reduce the side lobe light, and therefore the improvement of the surface side brightness has its limit.

Furthermore, a prism PL has a triangular cross section and therefore can easily be damaged during its manufacture, transport and installment to a backlight device, particularly at its apex. Such a defect is likely to result in a bright point or a dark point on the display. In order to prevent such defects, the prism sheet 100 before being installed into a display device must be provided with a protection film.

DISCLOSURE OF THE INVENTION

It is an object of the present invention to provide an optical sheet for a backlight that allows light from a surface light source to be more easily collected in the front surface direction.

Another object of the invention is to provide an optical sheet for a backlight that can reduce side lobe light.

Yet another object of the invention is to provide an optical sheet for a backlight that is less likely to be damaged and flawed.

An optical sheet for a backlight according to the invention is provided on a surface light source in the backlight. The optical sheet for a backlight includes an optical reflection layer and a plurality of cylindrical lenses. The optical reflection layer is a sheet type and has a plurality of through grooves arranged at a prescribed interval. The width of the through groove is narrowed from the upper surface to the lower surface of the optical reflection layer. The plurality of cylindrical lenses are each provided at a corresponding through groove. The cylindrical lens is filled in a corresponding through groove and having a cylindrical surface on the upper surface side of the optical reflection layer.

In the optical sheet for a backlight according to the invention, the angle of incidence of light coming into the cylindrical lens is limited by the optical reflection layer. More specifically, light from the surface light source comes into the cylindrical lens only from the opening of the through groove (hereinafter as "slit") formed at the lower surface of the optical reflection layer and reflected by the lower surface of the optical reflection layer other than at the slit. The slit width is smaller than the cylindrical lens width and therefore the angle of incidence of light reaching a incident point of the cylindrical surface of the cylindrical lens through the slit approximates the angle of incidence of light coming into the same incident point from the focal point of the cylindrical lens. Therefore, a major part of direct incident light to the cylindrical surface through the slit is deflected to the front surface and emitted as parallel light or a light beam with a small angle with respect to the optical axis to the front surface. Therefore, light from the surface light source can be collected to the front surface.

The light incident from the slit includes light with a wide angle with respect to the optical axis (hereinafter as "wide angle light"). When the wide angle light comes into the cylindrical surface of another cylindrical lens adjacent to the cylindrical lens corresponding to the through groove, the light is emitted as side lobe light. However, with the optical sheet according to the invention, incoming light with such a wide angle is reflected by the surface of the through groove, and therefore does not come into the adjacent cylindrical lens. Therefore, the side lobe light can be restrained.

The surface of the cylindrical lens is a cylindrical surface having a curvature and therefore not easily damaged for example during the manufacture unlike the prism lens. Therefore, a protection film is not necessary.

Preferably, the refractive index of the cylindrical lens is n, the radius of curvature of the cylindrical surface is r, and the height h of the cylindrical lens from the top of the cylindrical lens to the opening of the through groove formed at the lower surface of the optical reflection layer satisfies the following Expression (1)

$$nr/(n-1) \times 0.8 \leq h \leq nr/(n-1) \times 1.3 \qquad (1)$$

In this case, the angle of incidence of light incident form the slit that has reached an incidence point on the cylindrical surface approximates the angle of incidence when light reaches the same incident point from the focal point. Therefore, light coming into the cylindrical lens can be more collimated, which improves the front side brightness.

An optical sheet for a backlight according to the invention is provided on a surface light source in the backlight. The optical sheet for a backlight includes an optical reflection layer and a plurality of micro-lenses. The optical reflection layer is a sheet type and has a plurality of through holes. The through hole is gradually reduced in size from the upper surface to the lower surface of the optical reflection layer. The micro-lens is filled in the through hole and having a spherical surface on the upper surface side of the optical reflection layer.

In the optical sheet for a backlight according to the invention, the optical reflection layer limits light coming into the micro-lens. The size (area) of the opening of the through hole formed at the lower surface of the optical reflection layer is smaller than the opening space of the micro-lens. Therefore, in the light beam incident to the micro-lens, the angle of incidence of the light directly incident to a incident point (boundary surface) on the spherical surface of the micro-lens approximates the angle of incidence of light incident to the same incident point from the focal point of the micro-lens. Therefore, a major part of direct incident light to the cylindrical surface is deflected to the front surface and emitted to the front surface as parallel light or a light beam with a small angle with respect to the optical axis. Therefore, light from the surface light source can be collected to the front surface.

The surface of the through hole reflects incoming wide angle light and therefore the wide angle light is prevented from being emitted as side lobe light.

Preferably, the cross sectional shape of each of the through holes is a rectangle, and the longer sides of the cross sectional shapes of the through holes are substantially parallel to each other.

In this case, the optical sheet can adjust the viewing angles in two axial directions (such as the vertical and horizontal viewing angles) to be different angles. This is because the cross sectional shape of the through hole is a rectangle, and therefore outgoing light is less easily collected to the front surface in the longer side direction than in the shorter side direction. Therefore, the viewing angles in the two axial directions can be different angles from each other.

A backlight according to the invention includes the above-described optical sheet, a display device according to the invention includes a backlight including the above-described optical sheet, and a liquid crystal panel provided on the backlight.

BEST MODE FOR CARRYING OUT THE INVENTION

Figure 1:
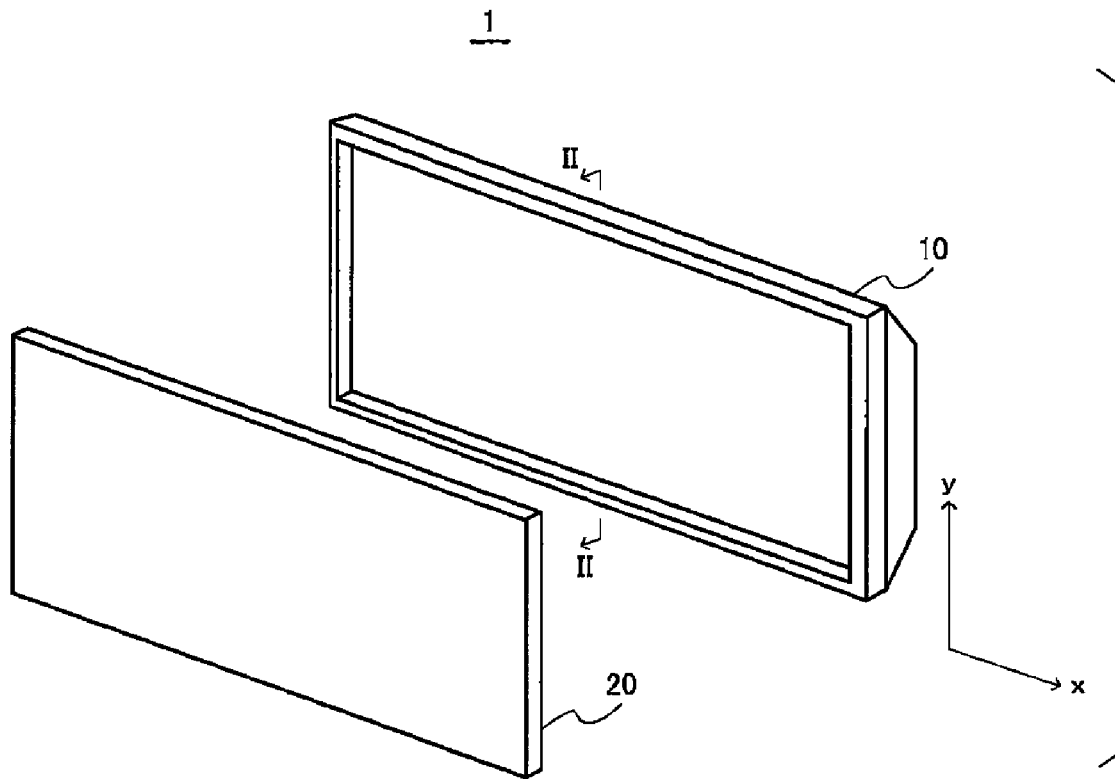
FIG. 1 is a perspective view of a display device including an optical sheet according to a first embodiment of the invention.

Now, embodiments of the invention will be described in detail with reference to the accompanying drawings, in which the same or corresponding portions are denoted by the same reference characters and their description equally applies.

First Embodiment

General Structure

Figure 2:
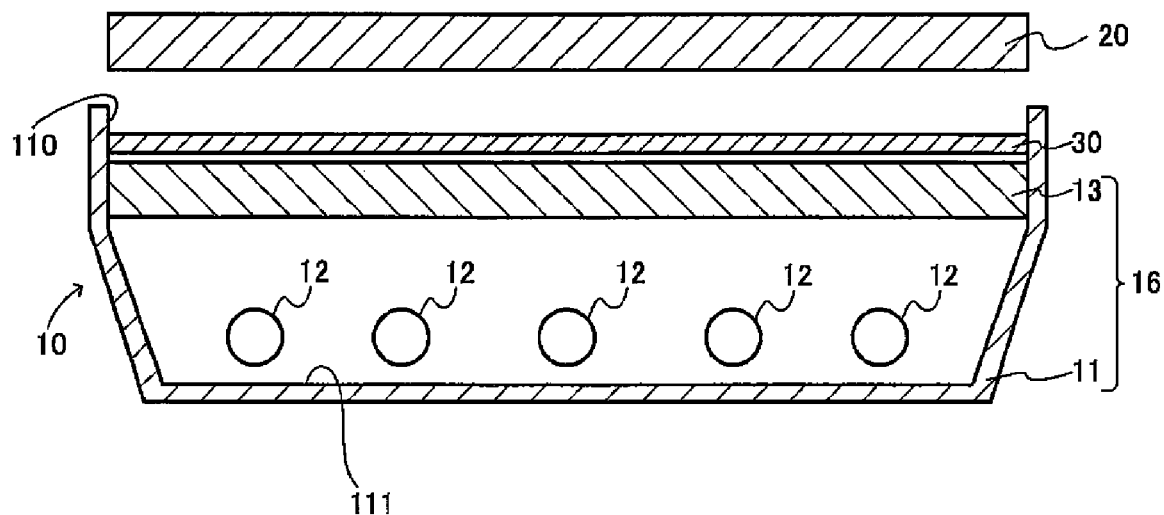
FIG. 2 is a sectional view taken along line II-II in FIG. 1.

With reference to FIGS. 1 and 2, a display device 1 includes a backlight device 10 and a liquid crystal panel 20 provided at the front surface of the backlight device 10.

The backlight device 10 includes a surface light source 16 that emits diffused light and an optical sheet 30 provided on the surface light source 16.

Surface Light Source

The surface light source 16 includes a housing 11, a plurality of cold cathode fluorescent lamps 12 and a light diffuser plate 13. The housing 11 is a case having an opening 110 at the front and stores the cold cathode fluorescent lamps 12 inside. The inside surface of the housing 11 is covered with an anti-reflection film 111. The anti-reflection film 111 diffusely reflects light emitted from the cold cathode fluorescent lamps 12 and guides the light to the opening 110. The anti-reflection film 111 may be for example Lumirror®E60L or E60V manufactured by Toray Industries, Inc. and preferably has a diffuse reflectance of 95% or more.

The plurality of cold cathode fluorescent lamps 12 are arranged in parallel in the vertical direction (y-direction in FIG. 1) in front of the back surface of the housing 11. The cold cathode fluorescent lamps 12 are so-called line light sources such as a fluorescent tube that extend in the horizontal direction (x-direction in FIG. 1). Note that a plurality of point light sources such as an LED (Light Emitting Device) may be stored in the housing 11 instead of the cold cathode fluorescent lamps 12.

The light diffuser plate 13 is fitted into the opening 110 and provided in parallel to the back surface of the housing 11. The light diffuser plate 13 diffuses light from the cold cathode fluorescent lamps 12 and light reflected by the anti-reflection film 111 and emits the light to the front surface. The light diffuser plate 13 includes a transparent base material and a plurality of particles dispersed in the base material. The refractive index of the particles dispersed in the base material to light having a wavelength in the visible light range is different from that of the base material, and therefore light incident to the light diffuser plate 13 is diffusely transmitted. Examples of the base material of the light diffuser plate 13 may include glass and resin such as polyester-based resin, polycarbonate-based resin, polyacrylate-based resin, alicyclic polyolefin-based resin, polystyrene-based resin, polyvinyl chloride-based resin, polyvinyl acetate-based resin, polyether sulfonate-based resin, and triacetylcellulose-based resin. The light diffuser plate 13 also serves as a supporter for the optical sheet 30.

The light diffuser plate 13 is fitted into the opening 110 so that the inside of the housing 11 is enclosed. Therefore, light from the cold cathode fluorescent lamps 12 can be prevented from being emitted to the outside of the housing 11 from any part other than from the light diffuser plate 13, which can improve the light use efficiency.

Optical Sheet

Structure of Optical Sheet

The optical sheet 30 is provided on the surface light source 16, deflects diffused light from the surface light source 16 in the front surface direction and improves the front side brightness.

Figure 3:
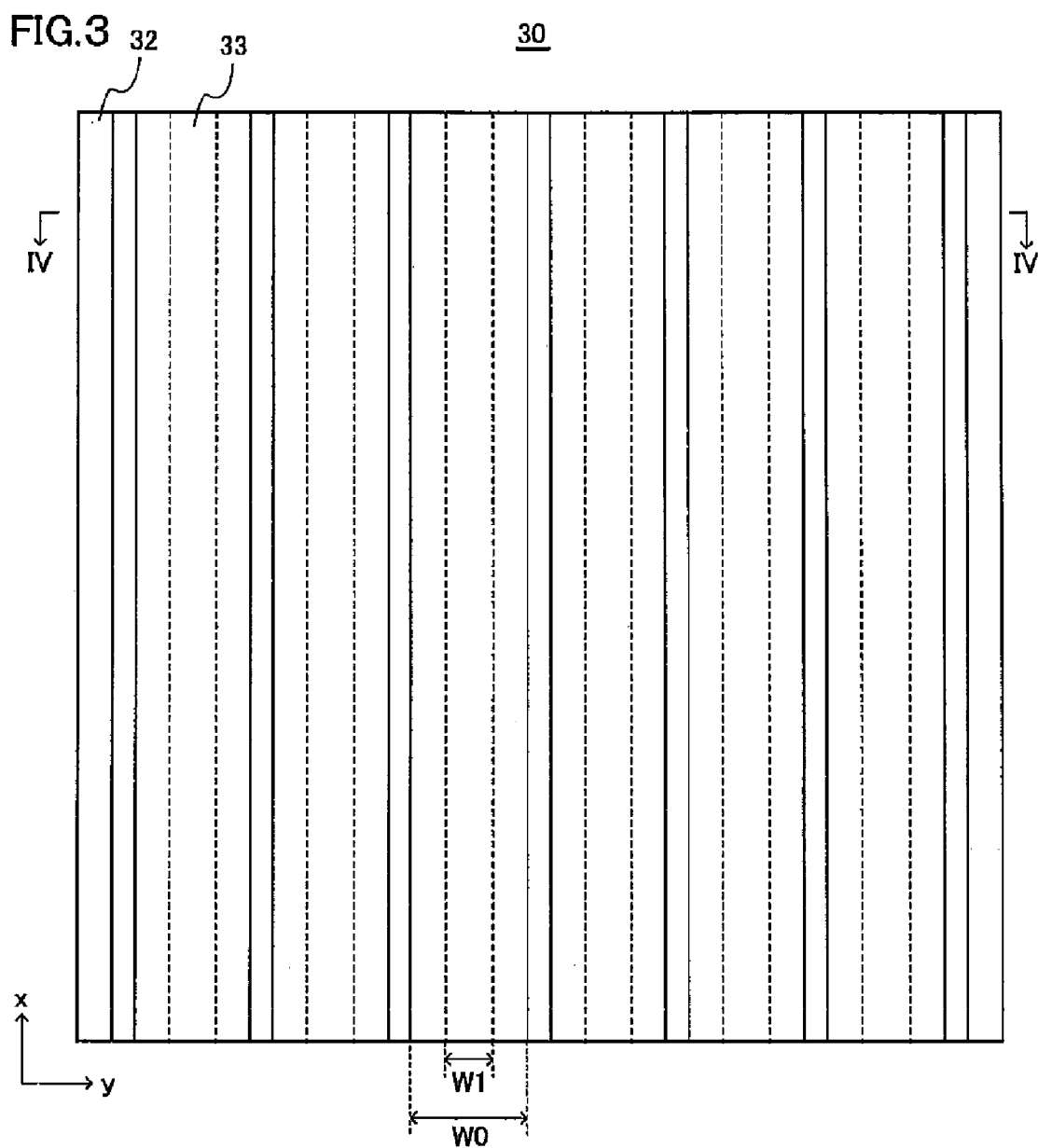
FIG. 3 is a top view of the optical sheet shown in FIG. 2.
Figure 4:
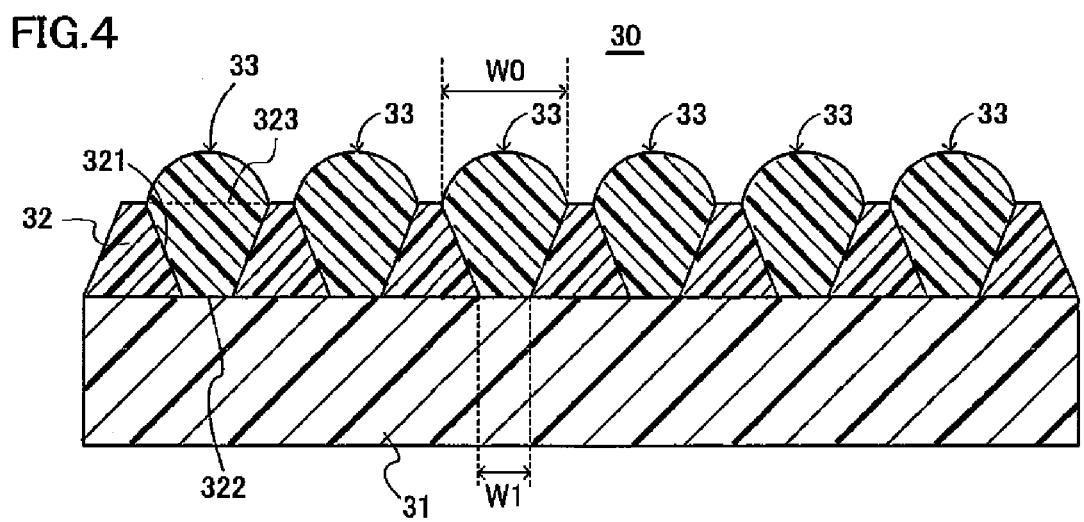
FIG. 4 is a sectional view taken along line IV-IV in FIG. 3.

With reference FIGS. 3 and 4, the optical sheet 30 is a so-called lenticular lens sheet and includes a transparent substrate 31, an optical reflection layer 32, and a plurality of cylindrical lenses 33.

The transparent substrate 31 is transparent to visibly light and in a plate state or a film state. The transparent substrate 31 may be made of glass or resin such as polyester-based resin, polycarbonate-based resin, polyacrylate-based resin, alicyclic polyolefin-based resin, polystyrene resin, polyvinyl chloride-based resin, polyvinyl acetate-based resin, polyether sulfonate-based resin, and triacetylcellulose-based resin.

The optical reflection layer 32 is provided on the transparent substrate 31. The optical reflection film 32 has a plurality of through grooves 321 arranged. The width of each of the through grooves 321 is gradually reduced from the upper opening 323 formed on the top surface of the optical reflection layer 32 toward the lower surface opening 322 formed on the lower surface of the optical reflection layer 32 (hereinafter referred to as slit 322) and is minimized at the slit 322. The optical reflection layer 32 limits light coming into the cylindrical lens 33 by the slit 322 and controls the angle of incidence of light at the cylindrical lens surface to improve the front side brightness.

The optical reflection layer 32 includes a material that diffuses and reflects visible light. For example, the optical reflection layer 32 includes resin as a base material and a plurality of inorganic particles dispersed in the resin. The inorganic particles have a refractive index different from that of the resin and examples of such inorganic particles may include titanium oxide, barium sulfate, zinc oxide, and aluminum oxide. Instead of the inorganic particles, acryl or glass hollow particles may be included in the resin. Alternatively, metal particles such as aluminum and silver may be included in the resin. The resin as the base material may be resin curable by ultraviolet irradiation, heat, and electron beam irradiation, or resin formed by dissolving the material in a solvent, followed by drying the solvent. The optical reflection layer 32 may be made of a metal.

The plurality of cylindrical lenses 33 are each provided in a corresponding through groove 321. The axial direction of the cylindrical lens 33 is substantially parallel to the direction in which the corresponding groove extends. The cylindrical lens 33 is filled within the through groove 321 and its surface is a cylindrical surface that covers the upper opening 323 of the through groove 321 formed on the top surface of the optical reflection layer 32. In short, the lens width W0 between both edges of the cylindrical lens 33 is wider than the width W1 of the slit 322. Note that in FIG. 4, the lens width W0 is the same as that of the upper surface opening 323 while the lens width W0 may be larger than that of the upper surface opening 323.

The surface of the cylindrical lens 33 is a cylindrical surface having a curvature and therefore not easily damaged during the manufacture unlike a prism lens having a vertical angle. Therefore, a protection film is not necessary.

Function of Optical Sheet (1) Controlling Angle of Incidence of Light

Figure 5:
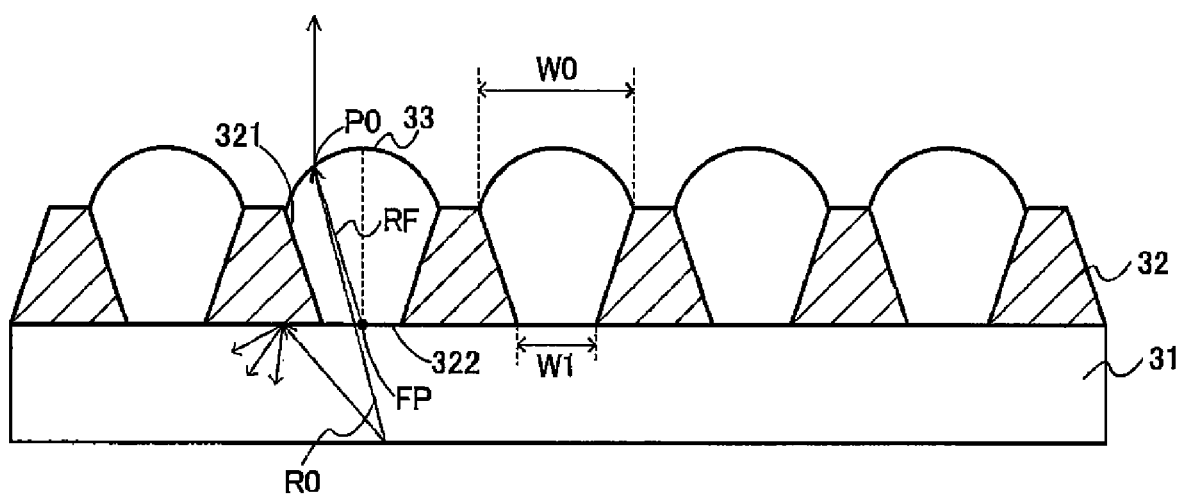
FIG. 5 is a schematic view for use in illustrating the principle of how the optical sheet shown in FIG. 3 collimates light from a light source.

The optical sheet 30 controls the angle of incidence of light from the surface light source 16 coming into the cylindrical surface of the cylindrical lens 33 and deflects more light in the front surface direction to improve the front side brightness. With reference to FIG. 5, a light beam R0 from the surface light source 16 comes into the cylindrical lens 33 only from the slit 322 of the optical reflection layer 32 and diffused and reflected by the lower surface of the optical reflection layer 32 excluding the slit 322. The width W1 of the slit 322 was narrower than the lens width W0 of the cylindrical lens 33. Therefore, in comparison to the conventional lenticular lens sheet, the light beam (hereinafter referred to as "direct incident light") directly coming into the cylindrical surface of the cylindrical lens 33 through the slit 322 without being reflected by the surface of the through groove 321 mostly comes into the cylindrical surface through the vicinity of the focal point FP of the cylindrical lens 33. When such direct incident light reaches an incident point (boundary surface) P0 on the cylindrical surface of the cylindrical lens 33, the angle of incidence of the direct incident light approximates the angle of incidence of light that has reached the same incident point P0 from the focal point FP. Therefore, the direct incident light 10 is deflected to the front surface and emitted to the front surface as parallel light or light having a small angle with respect to the direction of the front surface. Therefore, the front side brightness improves.

As described above, in order to emit a major part of the light beam incident to the cylindrical lens 33 as parallel light, the focal point FP of the cylindrical lens 33 is preferably located in the vicinity of the slit 322. The point will be described in detail in the following paragraphs.

Figure 6A:
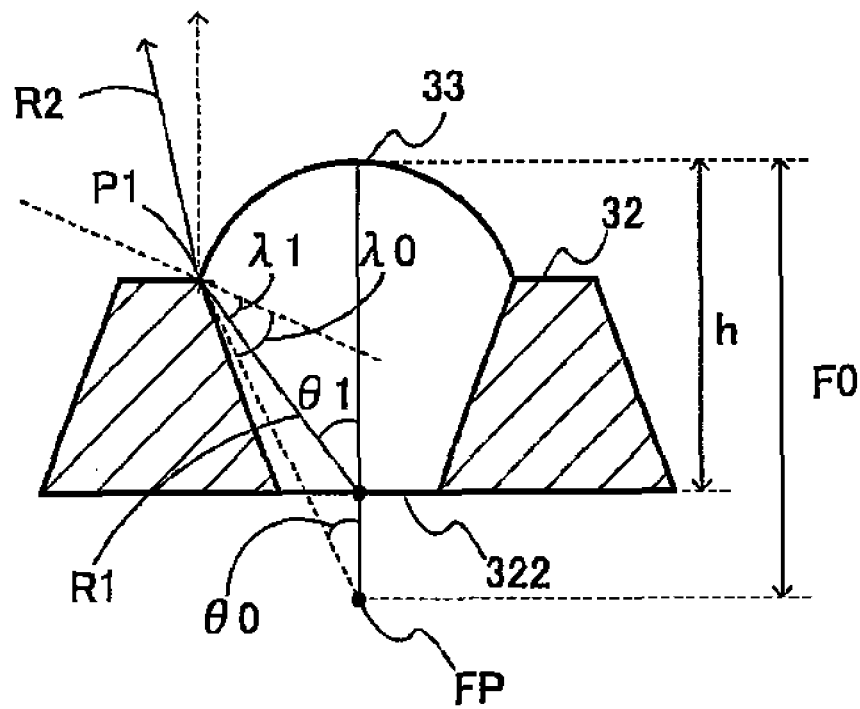
FIG. 6A is a schematic view for use in illustrating the relation between the height of a cylindrical lens in the optical sheet shown in FIG. 3 and the deflection of outgoing light.

As shown in FIG. 6A, assume that the focal distance F0 of the cylindrical lens 33 is too larger than the height h of the cylindrical lens 33 between the top of the cylindrical lens 33 and the slit 322. Here, assume that a light beam is to be incident to each of the cylindrical lenses 33 from the center of each of the slits 322. In this case, it is often the case that direct incident light R1 having an angle θ1 with respect to the optical axis greater than an angle θ0 from the focal point FP to the lens edge (hereinafter referred to as angular aperture) is incident to the cylindrical lens 33. In this case, the angle of incidence λ1 of the direct incident light R1 incident to the incident point P1 near the edge of the cylindrical surface is smaller than the angle of incidence λ0 of light incident to the incident point P1 from the focal point FP. Therefore, a light beam R2 to be emitted is not collimated, which lowers the front side brightness.

Figure 6B:
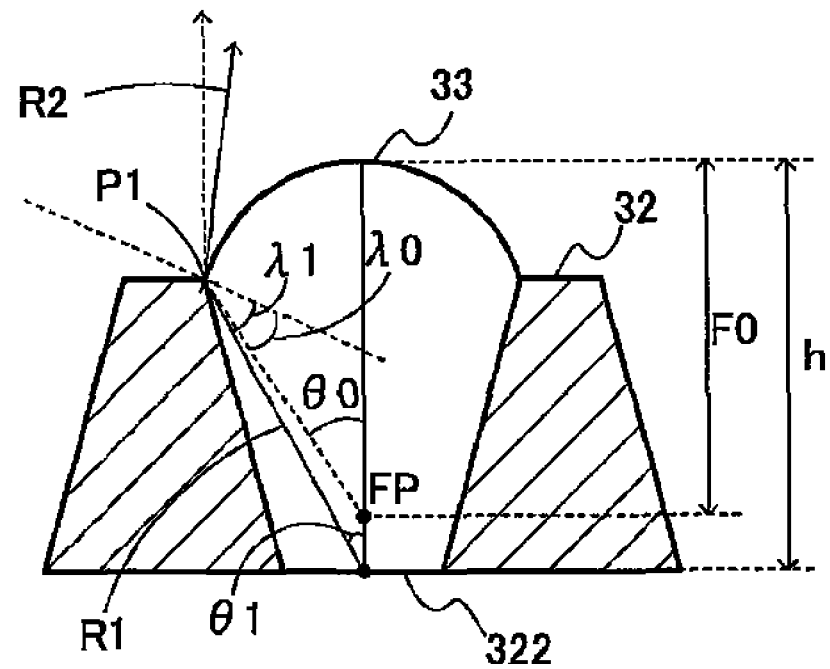
FIG. 6B is another schematic view different from FIG. 6A for use in illustrating the relation between the height of a cylindrical lens in the optical sheet shown in FIG. 3 and the deflection of outgoing light.

When the focal distance F0 is too shorter than the height h as shown in FIG. 6B, it is often the case that the incident light beam R1 has the angle θ1 with respect to the optical axis smaller than the angular aperture θ0. In this case, the angle of incidence λ1 of the light beam R1 coming into the incident point P1 in the vicinity of the edge of the cylindrical surface in particular is greater than the angle of incidence λ0, and the light beam R2 is more easily inclined toward the center of the lens than toward the front surface, which lowers the front side brightness.

When the height h is approximated to the focal distance F0 and the focal point FP of the cylindrical lens 33 is positioned near the slit 322, a major part of the light coming into the cylindrical lens 33 is emitted as it is deflected to the front surface, which improves the front side brightness.

The height h preferably satisfies the following Expression (1):

$$nr/(n-1) \times 0.8 \leq h \leq nr/(n-1) \times 1.3 \quad (1)$$

where n represents the refractive index of the cylindrical lens 33 and r is the radius of curvature of the cylindrical surface of the cylindrical lens 33.

In Expression (1), $nr/(n-1)$ represents the focal distance F0. When the height h is less than 0.8 times the focal distance F0, the amount of uncollimated light increases as shown in FIG. 6A and therefore the front side brightness approximately equals that of the prism lens. Therefore, the lower limit in Expression (1) is 0.8.

On the other hand, when the height h exceeds 1.3 times the focal distance F0, the height of the optical reflection layer 32 is excessively increased. As the height of the optical reflection layer 32 increases, it would be more difficult to produce the optical sheet 30. For example, when ultraviolet curing resin including inorganic particles, hollow particles, metal particles and the like is used as the optical reflection layer 32, it becomes more difficult to cure the ultraviolet curing resin as the height of the optical reflection layer 32 increases. This is because the particles such as inorganic particles included in the resin diffuse and reflect ultraviolet rays and the ultraviolet rays cannot sufficiently contribute to curing of the resin. Therefore, for the ease of forming the optical reflection layer 32, the height h is preferably not more than 1.3 times the focal distance F0. Note that if the height h exceeds 1.3 times, the front side brightness gradually decreases for the reason shown in FIG. 6B, but the front side brightness higher than that by the prism sheet is still provided.

If the height h satisfies Expression (1), a major part of incident light to the cylindrical lens 33 can be deflected toward the front surface and the front side brightness can be improved. Note that even if the height h does not satisfy Expression (1), the advantage of the invention may be obtained to some extent.

(2) Prevention of Side Lobe Light

Figure 7:
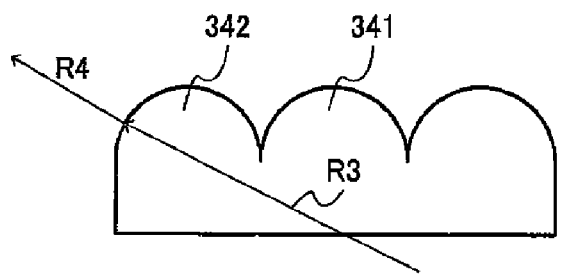
FIG. 7 is a schematic view for use in illustrating the cause of side lobe light.

The optical sheet 30 restrains side lobe light from being generated using the optical reflection layer 32. With reference to FIG. 7, assume that in the conventional lenticular lens sheet, light R3 with a wide angle to the optical axis (hereinafter referred to as "wide angle light") comes into the cylindrical lens 341. In this case, the wide angle light R3 is incident to the cylindrical surface of another cylindrical lens 342 adjacent to the cylindrical lens 341 and emitted as side lobe light R4 with a wide angle to the optical axis. The wide angle light R3 is likely to form the side lobe light R4.

Figure 8:
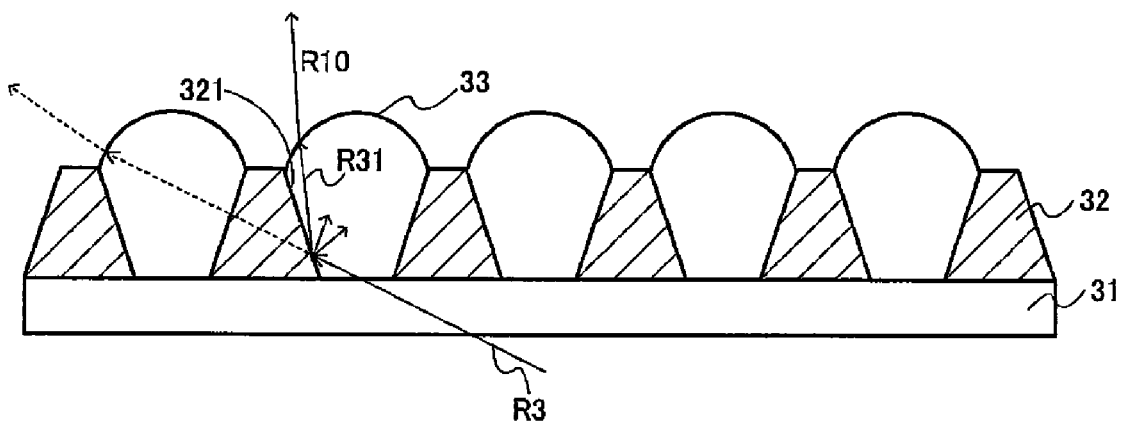
FIG. 8 is a schematic view for use in illustrating the principle of how the optical sheet shown in FIG. 3 restrains side lobe light.

With the optical sheet according to the embodiment, the wide angle light R3 comes into the surface of a through groove 321 as shown in FIG. 8 and diffused and reflected into the cylindrical lens 33. Therefore, the wide angle light R3 does not come into another adjacent cylindrical lens 33 as denoted by the dotted line in FIG. 8. Therefore, the side lobe light can be restrained.

(3) Use of Reflected Light in Optical Reflection Layer

The optical reflection layer 32 not only restrains the side lobe light but also improves the front side brightness by emitting the wide angle light R3 as parallel light. As described above, the wide angle light R3 is diffused and reflected at the surface of the through groove 321, while the diffused and reflected light includes light R31 incident to the cylindrical surface of the cylindrical lens 33 as shown in FIG. 8. Hereinafter, light such as the light R31 will be referred to as indirect incident light R31. The indirect incident light R31 includes light emitted as parallel light R10. Therefore, the optical reflection layer 32 not only restrains wide angle light from being emitted as side lobe light but also emits the wide angle light R3 as the parallel light R10, which contributes to improvement of the front side brightness.

Other Embodiments

Figure 9:
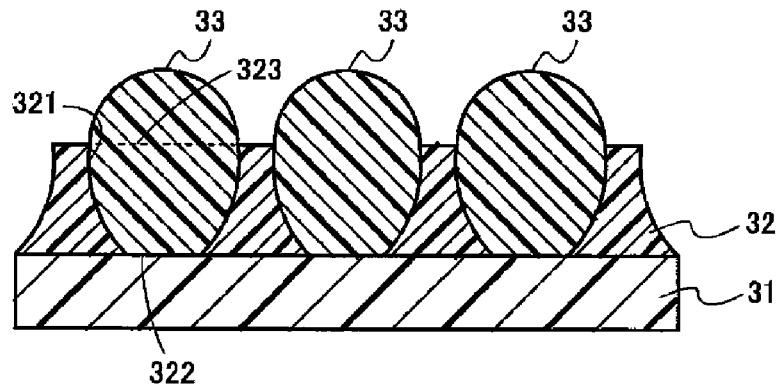
FIG. 9 is a sectional view of another optical sheet having a different shape from the optical sheet shown in FIG. 3.
Figure 10:
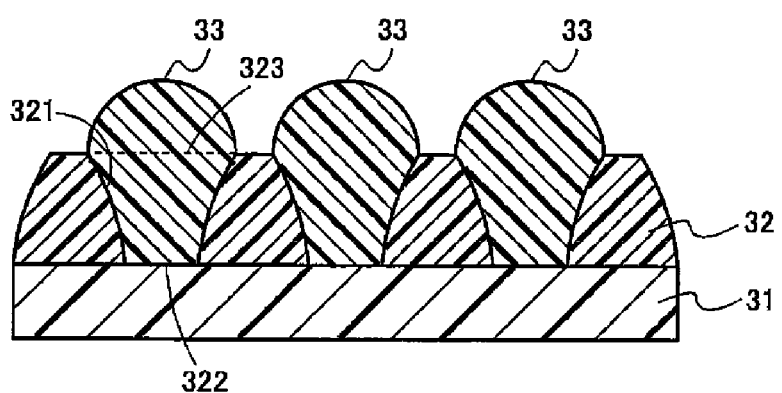
FIG. 10 is a sectional view showing the shape and size of another optical sheet having a different shape from the optical sheets shown in FIGS. 3 and 9.

In the above-described optical sheet 30, the surface of the through groove 321 is flat, but the surface may have a different shape. For example, the surface may be a recessed curved surface as shown in FIG. 9 or the surface may be a raised curved surface as shown in FIG. 10. In short, the width of the through groove 321 needs only be gradually narrowed toward the slit 322 from the upper opening 323.

Figure 11:
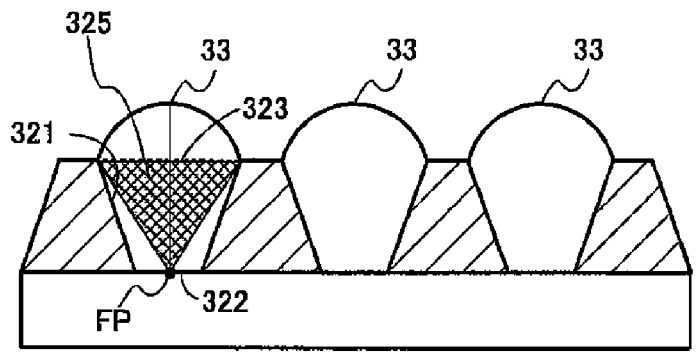
FIG. 11 is a schematic view for use in illustrating a preferable shape for the wall surface of a through groove in the optical sheet in FIG. 3.

Note however as shown in FIG. 11, the surface of the through groove 321 is preferably formed outside the region 325 connecting the focal point FP of the cylindrical lens 33 and both edges. The direct incident light passing through the region 325 is emitted as it is deflected toward the front surface. If the surface of the through groove 321 is present in the region 325, light that would otherwise be deflected to the front surface as the direct incident light is reflected by the surface of the through groove 321 in some cases. In order to reduce the cases, the surface of the through groove 321 is preferably formed outside the region 325.

According to the embodiment, the cylindrical lenses 33 are arranged in parallel to one another in the vertical direction in the display device 1 (y-direction in FIG. 1), while they may be arranged in parallel to one another in the horizontal direction (x-direction in FIG. 1). The vertical arrangement can control the vertical viewing angle and the horizontal arrangement can control the horizontal viewing angle.

The cylindrical lenses 33 may be arranged in a slightly winding manner rather than being straight. The cylindrical lenses 33 may be arranged in a winding manner corresponding to the pixel arrangement of the liquid crystal panel.

Second Embodiment

The above-described optical sheet 30 is the lenticular lens sheet, while the optical sheet according to the invention may be a micro-lens array. Now, a micro-lens array as the optical sheet will be described.

Figure 12:
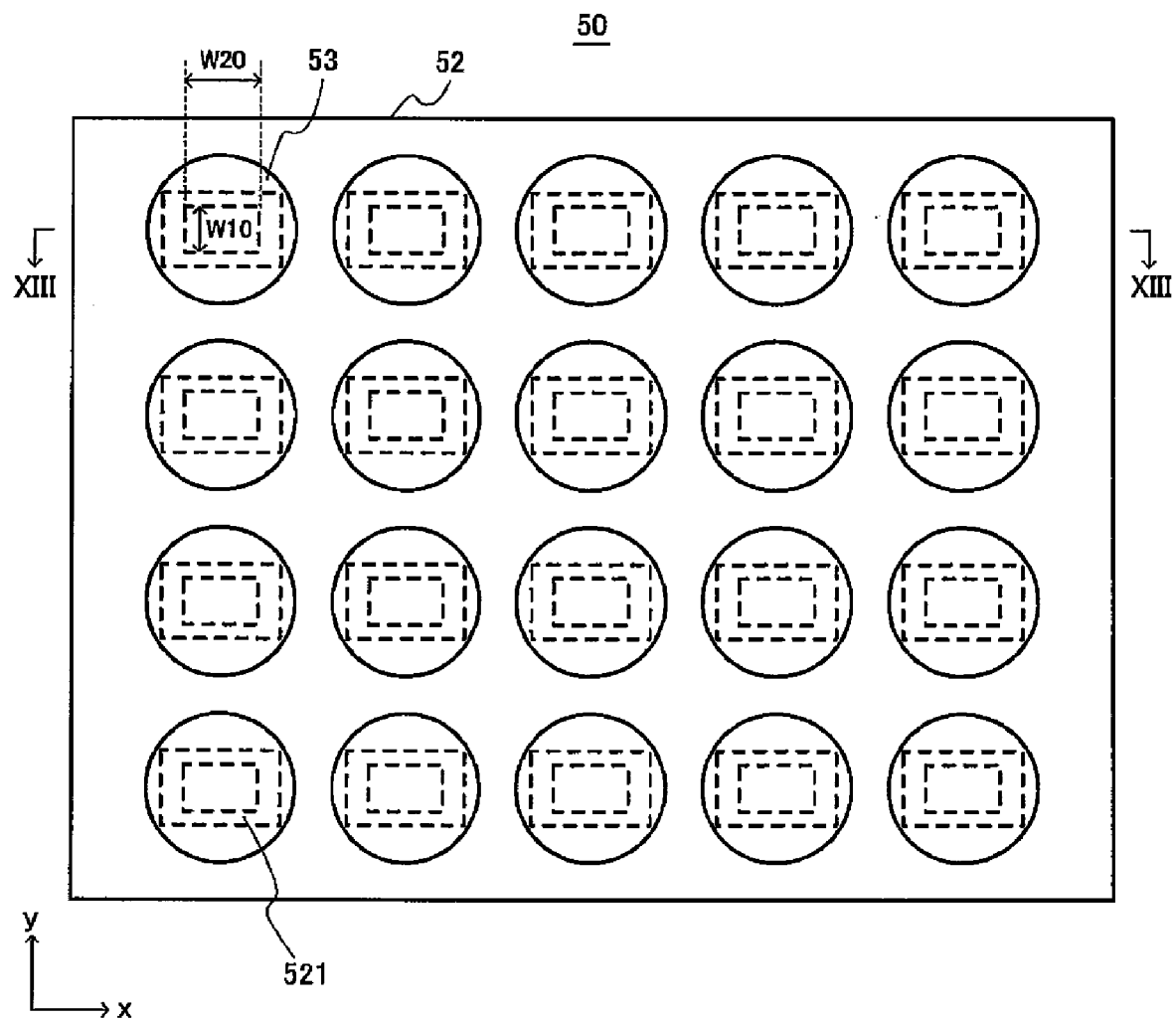
FIG. 12 is a top view of an optical sheet according to a second embodiment of the invention.
Figure 13:
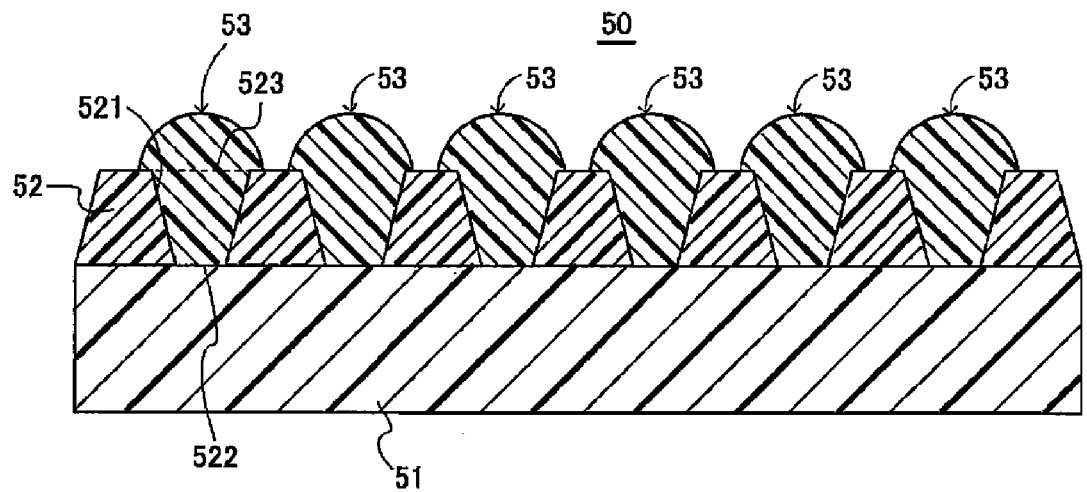
FIG. 13 is a sectional view taken along line XIII-XIII in FIG. 12.

With reference to FIGS. 12 and 13, the optical sheet 50 includes a transparent substrate 51, an optical reflection layer 52, and a plurality of micro lenses 53 arranged in a matrix (array).

The transparent substrate 51 is transparent to visible light similarly to the transparent substrate 31 and in a plate or film state.

The optical reflection layer 52 is provided on the transparent substrate 51. The optical reflection layer 52 has a plurality of through holes 521 provided in a matrix. The cross sectional shape of the through hole 521 is a rectangle that is gradually reduced in size from the upper surface to the lower surface of the optical reflection layer 52 and minimized at the opening 522 at the lower surface of the optical layer 52 (hereinafter referred to as "lower surface opening"). The material of the optical reflection layer 52 is the same as that of the optical reflection layer 32.

The plurality of micro lenses 53 are each provided in a corresponding through hole 521. The micro lens 53 fills the corresponding through hole 521 and its surface is a spherical surface that covers the opening 523 of the through hole formed on the upper surface of the optical reflection layer 52 (hereinafter referred to as "upper surface opening"). The cylindrical lens 33 deflects light only in one of the vertical direction (y-direction in FIG. 1) and the horizontal direction (x-direction in FIG. 1) toward the front surface since the lens has a cylindrical surface, but the micro lens 53 can deflect light both in the vertical and horizontal directions toward the front surface since the lens has a spherical surface. Therefore, as compared to the cylindrical lens 33, the front side brightness can be improved.

Function of Optical Sheet

The optical sheet 50 has the same functions and effects as those of the optical sheet 30. More specifically, the sheet controls the angle of incidence of light incident to the spherical surface of the micro lens 53 from a surface light source so that an increased amount of parallel light is emitted and the front side brightness is improved. The optical reflection layer 52 prevents the wide angle light from coming into adjacent micro lenses 53, so that the side lobe light is restrained. Furthermore, wide angle light is diffused and reflected by the optical reflection layer 52 and therefore indirect incident light is allowed to come into the spherical surface of the micro lens 53, so that part of the wide angle light can be emitted as parallel light. In the optical sheet 50, the focal point of the micro lens is preferably in the vicinity of the lower surface opening 522.

The optical sheet 50 can further adjust the vertical and horizontal viewing angles to be different angles. The cross sectional shape of each of the through holes 521 is a rectangle and the longer sides of the cross sectional shape of each of the through holes 521 are substantially parallel to each other. In short, the longer side direction of the cross sectional shape of each of the through holes 521 is substantially parallel to the horizontal direction (x-direction in FIG. 1). Since the cross sectional shape of the through hole 521 is a rectangle, the width W10 of the lower surface opening 522 in the vertical direction (y-direction in FIG. 1) is narrower than the width W20 in the horizontal direction. Therefore, the angle of incidence of incoming light in the horizontal direction is less controlled than in the vertical direction, so that outgoing light is less easily collected in the horizontal direction than in the vertical direction. Therefore, the vertical viewing angle can be narrower than the horizontal viewing angle.

The cross sectional shape of each of the through holes 521 may be an elliptical arc shape instead of the rectangle and still the same advantage results. In FIG. 12, the plurality of through holes 521 are arranged in a matrix, while they may be arranged in a zigzag manner or in a close-packed manner.

With the display device 1 such as a liquid crystal display, it is more often the case for the user to view the screen obliquely from the right or left than obliquely from above or below. The use of the optical sheet 50 allows the horizontal viewing angle to be wider than the vertical viewing angle. By setting the cross sectional shape of the through holes 521 as required, the vertical and horizontal viewing angles can be adjusted suitably for the display device.

First Embodiment

Figure 14:
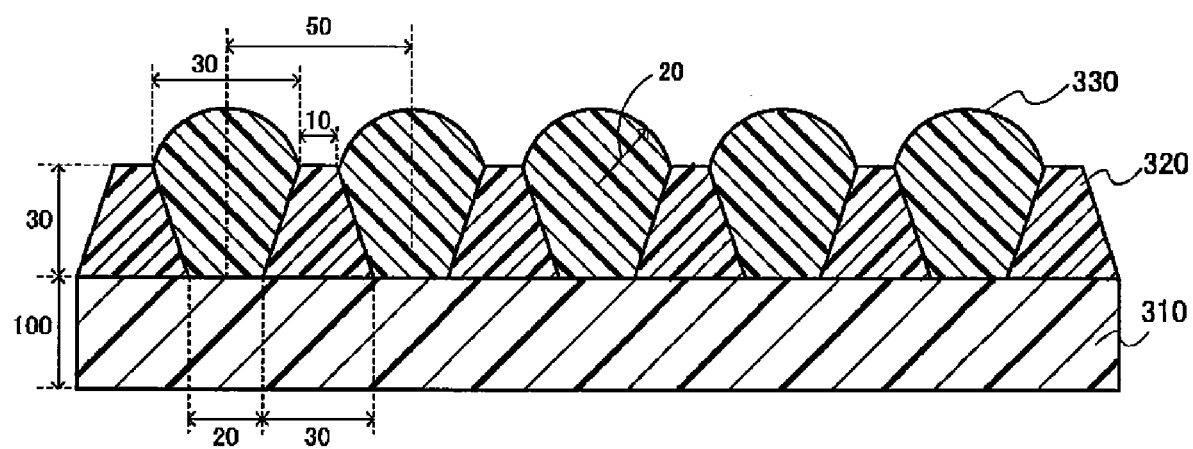
FIG. 14 is a sectional view showing the shape and size of an optical sheet used according to the first embodiment.

An optical sheet (lenticular lens sheet) according to Inventive Example 1 in a shape as shown in FIGS. 3 and 14 and a prism sheet according to a comparative example were produced and examined for their angular distributions of brightness.

Manufacturing Method

The optical sheet according to Inventive Example 1 was produced by the following method. To start with, a concave roll plate having a plurality of grooves arranged in the axial direction and extending in the circumferential direction was prepared. The cross sectional shape of grooves in the concave roll plate was a trapezoid, the bottom width was 10 μm, the upper width was 30 μm, the groove depth was 30 μm, and the pitch of the grooves was 50 μm.

The grooves of the thus prepared concave roll plate were filled with ultraviolet curing resin containing 40 parts by weight of titanium oxide particles. A polyethylene terephthalate (PET) film 310 as thick as 100 μm was prepared as a transparent substrate. The ultraviolet curing resin filled within the grooves of the concave roll plate was pressed against the PET film for transfer while being irradiated with ultraviolet rays, and an optical reflection layer 320 having a plurality of through grooves was formed on the PET film 310.

Then, a cylindrical lens 330 was formed on a through groove. Using a die coater, an ultraviolet curing resin layer about as thick as 30 μm was formed on the optical reflection layer 320. At the time, the ultraviolet curing resin layer also fills each of the through grooves.

A roll plate having in the circumferential direction a plurality of grooves whose semi-circular cross sectional shape was the same as that of the cylindrical lens 330 was pressed against the ultraviolet curing resin layer, and the cylindrical lenses 330 were formed while being irradiated with ultraviolet rays. At the time, the groove pitch of the roll plate was 50 μm and the radius of curvature of the semi-circular cross sectional shape was 20 μm. The position of the roll plate was adjusted so that the top of the cylindrical lens 330 was provided in the center of the opening of a corresponding through groove.

The optical sheet shown in FIG. 14 was produced by the above-described method. The unit of each size in FIG. 14 is μm.

Figure 24:
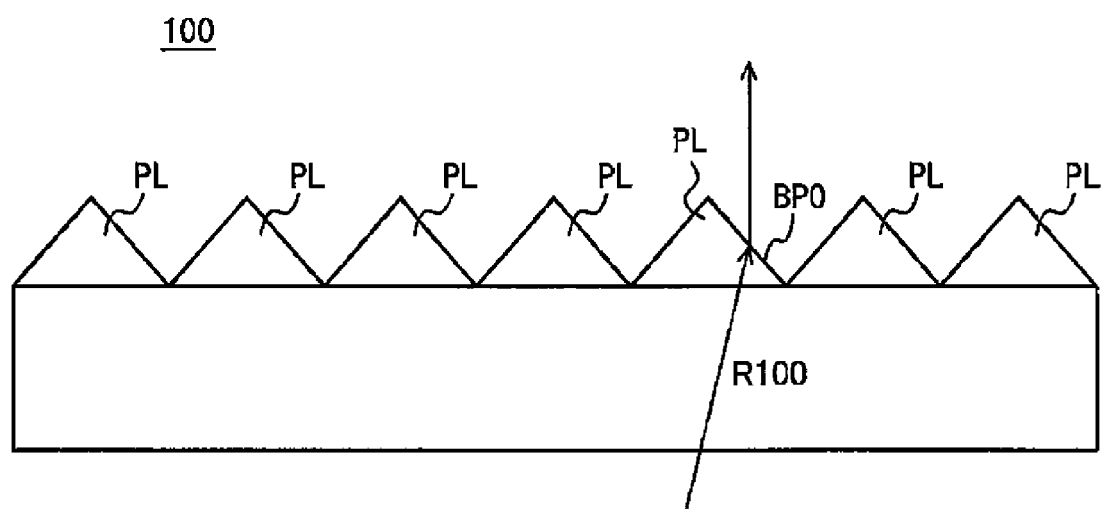
FIG. 24 is a cross sectional view of a conventional prism sheet.

The prism sheet according to the comparative example was produced by the following method. An ultraviolet curing resin layer as thick as 30 μm was formed on a PET sheet as thick as 100 μm using a die coater. Using a roll plate having grooves whose cross sectional shape was an isosceles triangle, the prism sheet in a shape shown in FIG. 24 was produced. At the time, the prism pitch was 50 μm and the vertical angle was 90°.

Examination of Angular Distribution of Brightness

The produced optical sheet according to Inventive Example 1 and the prism sheet according to the comparative example were examined for their angular distributions of brightness. The optical sheet according to Inventive Example 1 was provided in a housing that stored cold cathode fluorescent lamps and had a reflection film provided inside and an optical diffuser plate fitted at its opening. The cylindrical lenses of the optical sheet were arranged in the vertical direction.

After the optical sheet according to Inventive Example 1 was provided on the housing, the angular distribution of brightness was examined. As for the viewing angles, the normal line direction to the optical sheet (front surface) was set as a 0 degree axis, the inclination from the 0 degree axis in the vertical direction was the vertical viewing angle and the inclination from the 0 degree axis in the horizontal direction was the horizontal viewing angle. The brightness for the vertical viewing angle was measured by a brightness photometer.

Similarly, the prism sheet according to the comparative example was provided on the housing and examined for the angular distribution of brightness. At the time, the prisms were arranged in the vertical direction.

Figure 15:
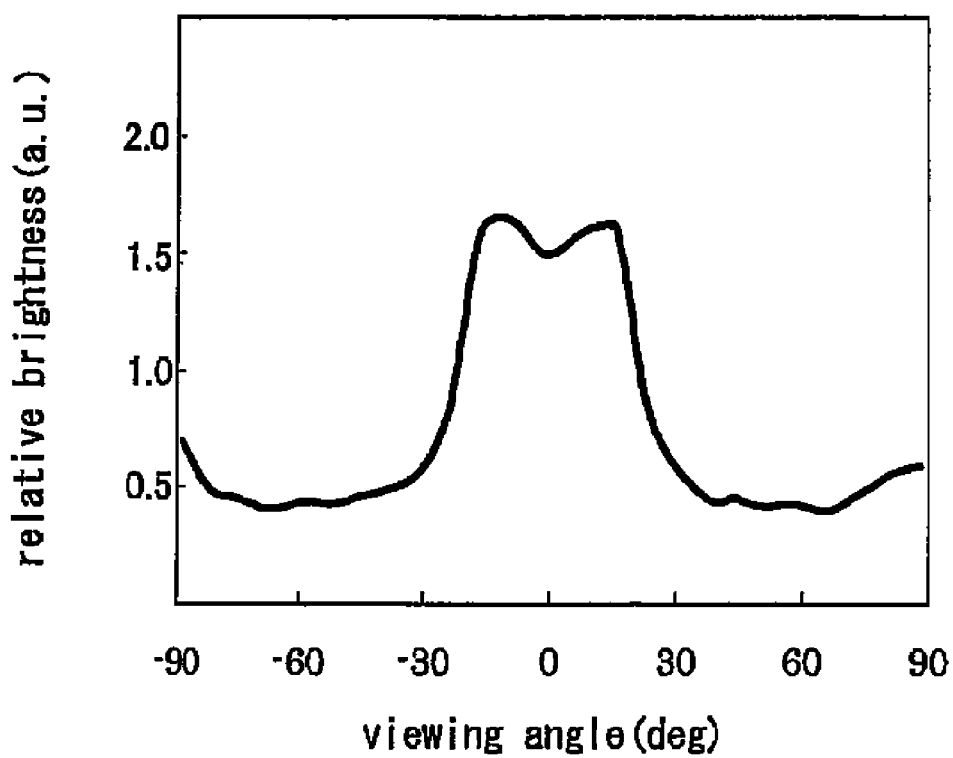
FIG. 15 shows the angular distribution of brightness produced according to the first embodiment.
Figure 25:
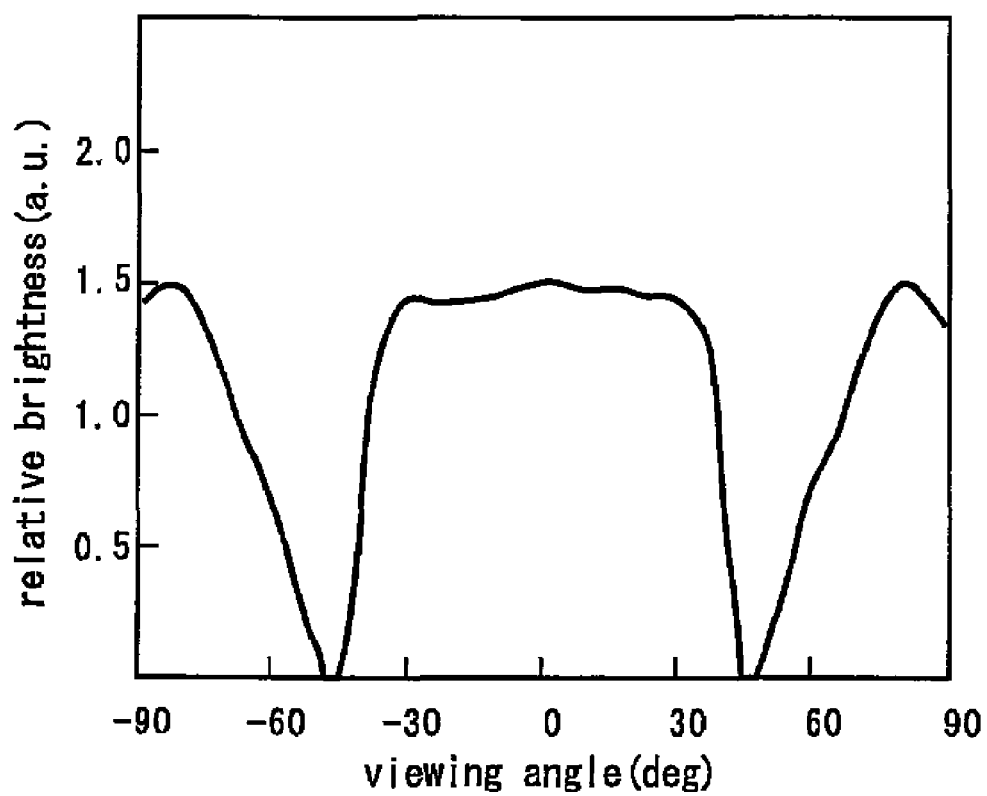
FIG. 25 shows the angular distribution of brightness obtained for a conventional prism sheet.

The angular distribution of brightness in the optical sheet according to Inventive Example 1 is given in FIG. 15 and the angular distribution of brightness in the prism sheet according to the comparative example is given in FIG. 25. The abscissas in FIGS. 15 and 25 each represent the vertical viewing angle (deg), the ordinates each represent relative brightness (a. u.) to the front side brightness of the optical diffuser plate in the housing as a reference (1.0). With reference to FIGS. 15 and 25, side lobes were generated around viewing angles of −90° to −60° and 60° to 90° in the comparative example, but almost no side lobe was generated in Inventive Example 1.

The relative brightness in the vicinity of the front surface (the range of a viewing angle of ±30°) in Inventive Example 1 exceeded 1.5, which was greater than the relative brightness in the vicinity of the front surface in the comparative example (about 1.5).

Second Embodiment

Figure 16:
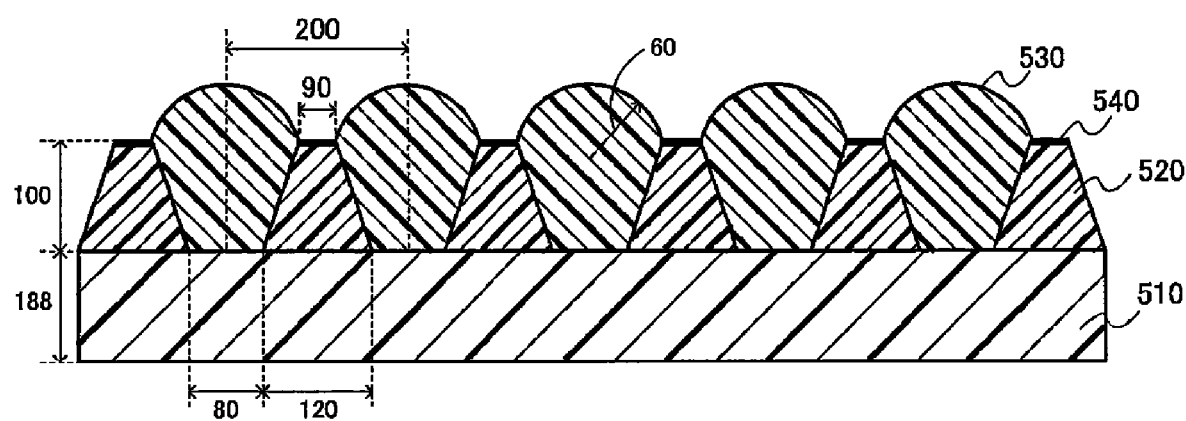
FIG. 16 is a sectional view showing the shape and size of an optical sheet used according to the second embodiment.

An optical sheet (micro-lens array) according to Inventive Example 2 in a shape shown in FIGS. 12 and 16 were produced and examined for the angular distribution of brightness.

Manufacturing Method

The optical sheet according to Inventive Example 2 was produced by the following method. To start with, a PET film 510 as thick as 188 μm was prepared as a transparent substrate. Using a rotary screen plate in a rectangular mesh pattern in which the pitch was 200 μm and the line width was 120 μm, ink produced by having 75 parts by weight of titanium oxide and 25 parts by weight of acrylic resin dispersed in toluene was screen-printed on the PET film 510, and an optical reflection layer 520 having a plurality of through holes was formed.

Then, the upper surface of the optical reflection layer was provided with a fluorine-based moisture proof coating (HANARL®FZ-610C manufactured by Kanto Kasei Ltd.) 540. After being provided with the coating 540, ultraviolet curing resin about as thick as 10 μm was applied on the optical reflection layer 520 using a die coater. At the time, the ultraviolet curing resin also filled the through holes.

The applied ultraviolet curing resin was repelled in the region coated with the fluorine-based moisture proof coating 540 to form semi-spherical lenses having a radius of about 60 μm by surface tension. The ultraviolet curing resin provided with the lenses was irradiated with ultraviolet rays, so that micro-lenses 530 were formed.

The optical sheet having the size as shown in FIG. 16 was produced by the above-described method. The unit of each size in the figure is μm.

The optical sheet according to Inventive Example 2 was provided on the housing as a surface light source, and the angular distribution of brightness for the vertical viewing angle was examined.

Figure 17:
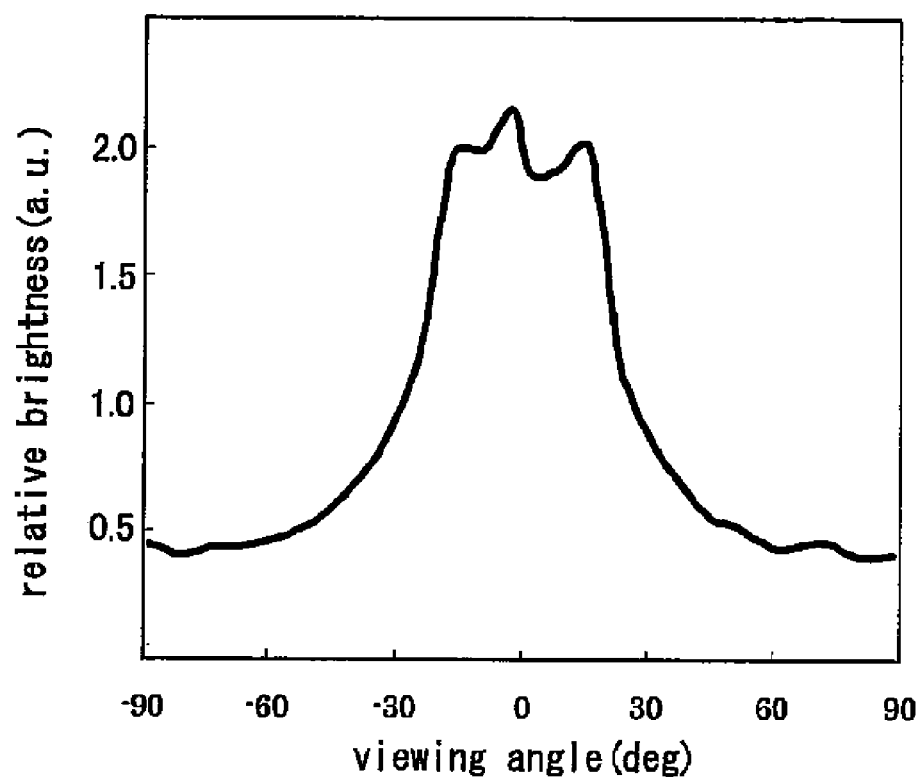
FIG. 17 shows the angular distribution of brightness obtained according to the second embodiment.

The result of examination is given in FIG. 17. In comparison with FIG. 25, no side lobe was generated in Inventive Example 2. The relative brightness in the vicinity of the front surface (the range of a viewing angle of ±30°) was about 2.0, so that the front side brightness was improved as compared to the prism sheet.

Third Embodiment

Figure 18:
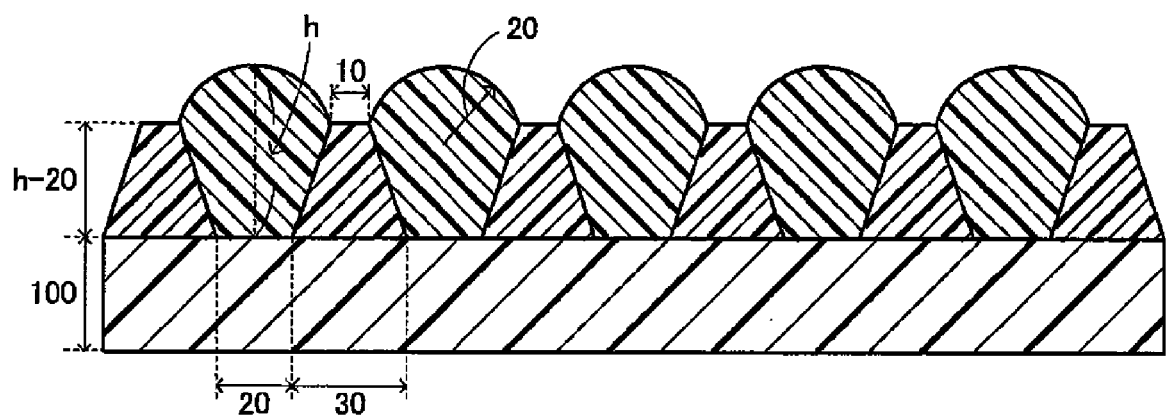
FIG. 18 is a sectional view showing the shape and size of an optical sheet used according to a third embodiment.
Figure 19:
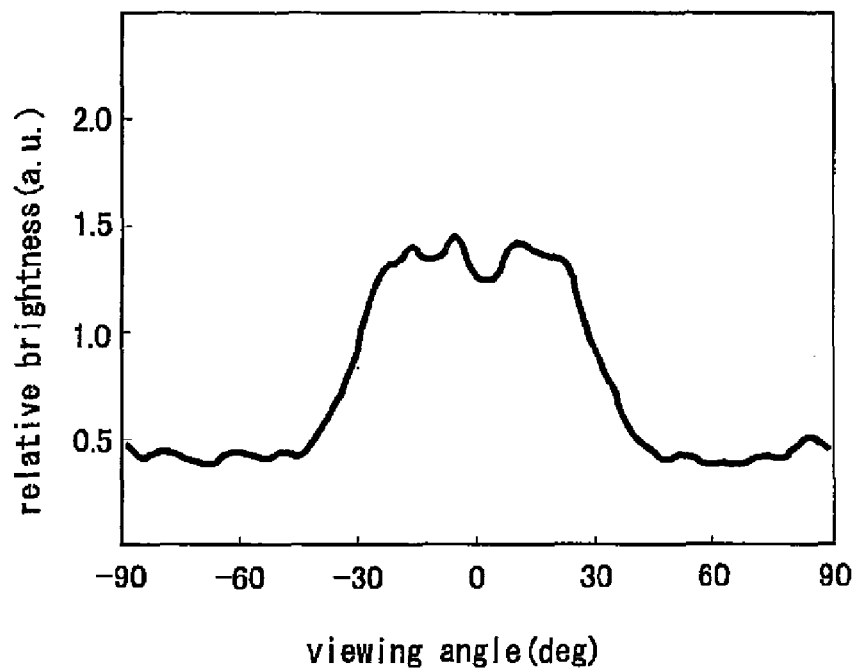
FIG. 19 shows the angular distribution of brightness obtained for optical sheet Test No. 1 according to the third embodiment.
Figure 20:
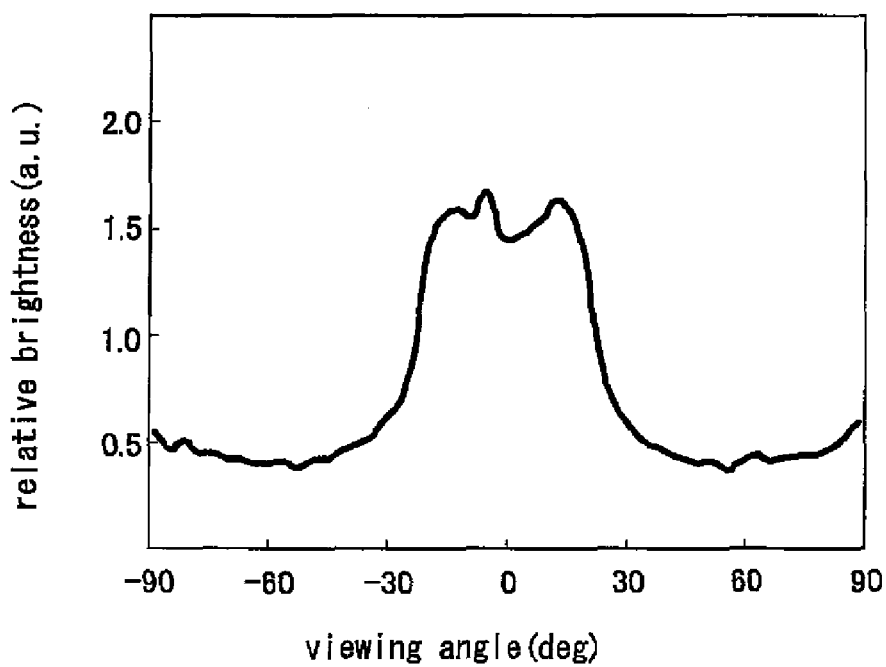
FIG. 20 shows the angular distribution of brightness obtained for optical sheet Test No. 2 according to the third embodiment.
Figure 21:
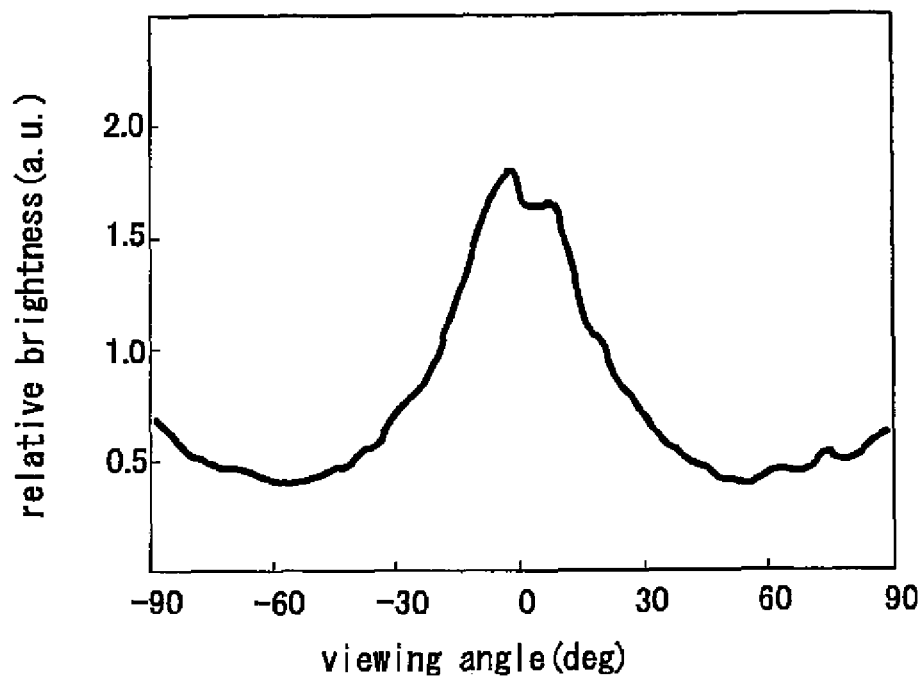
FIG. 21 shows the angular distribution of brightness obtained for optical sheet Test No. 6 according to the third embodiment.
Figure 22:
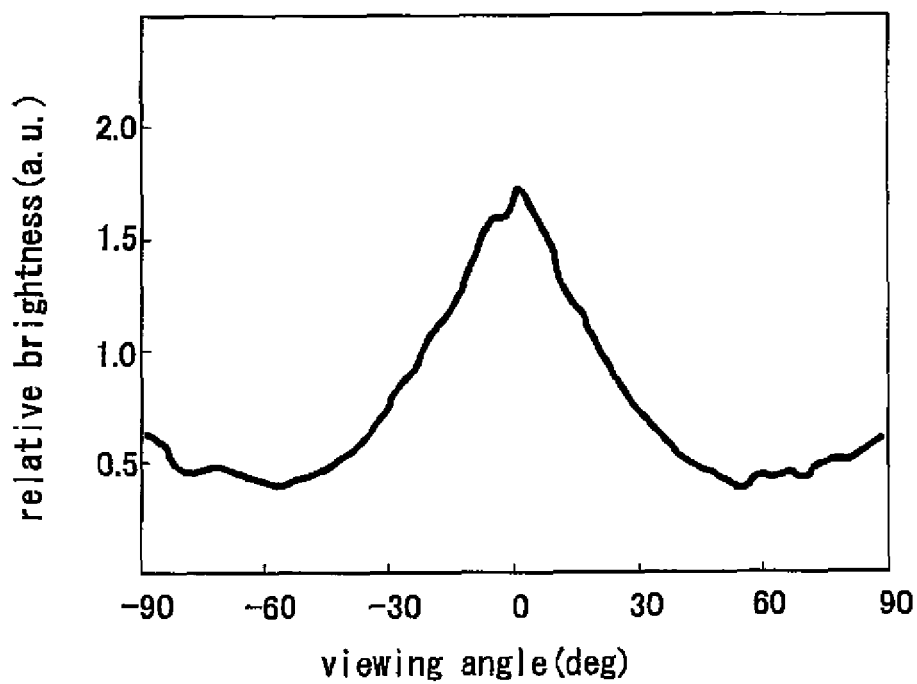
FIG. 22 shows the angular distribution of brightness obtained for optical sheet Test No. 7 according to the third embodiment.

Various optical sheets (lenticular lens sheets) in Table 1 having the sizes shown in FIG. 18 was produced while the height h between the top of the cylindrical lens and the lower opening of the through hole was changed and examined for their front side brightness.

TABLE 1

| test No. | height h (μm) | EX0 = h/ (nr/(n − 1)) |
|---|---|---|
| 1 | 37.3 | 0.7 |
| 2 | 48 | 0.9 |
| 3 | 50 | 0.93 |
| 4 | 53.3 | 1 |
| 5 | 58.7 | 1.1 |
| 6 | 69.3 | 1.3 |
| 7 | 80 | 1.5 |

With reference to Table 1, the value for EX0 was produced by the following Expression (2):

$$EX0 = h/(nr/(n-1)) \quad (2)$$

where n, the refractive index of a cylindrical lens was 1.54 (n=1.54), and r, the radius of curvature of the cylindrical surface of the cylindrical lens was 20 μm as shown in FIG. 18.

With reference to Table 1, for optical sheets Test Nos. 2 to 6, EX0 was in the range from 0.8 to 1.3 and all satisfied Expression (1). The value for EX0 for optical sheet Test No. 1 was 0.7, and the height h was less than the lower limit for Expression (1). The value for EX0 for optical sheet Test No. 7 was 1.5 and the height h exceeded the upper limit for Expression (1).

The optical sheets Test Nos. 1 to 7 were produced by the same manufacturing method as that of the first embodiment.

Using each of the optical sheets 30 with the test numbers, the angular distribution of brightness for the vertical viewing angle was examined similarly to the first embodiment.

The examination results for Nos. 1, 2, 6, and 7 are given in FIGS. 19, 20, 21, and 22, respectively.

Figure 23:
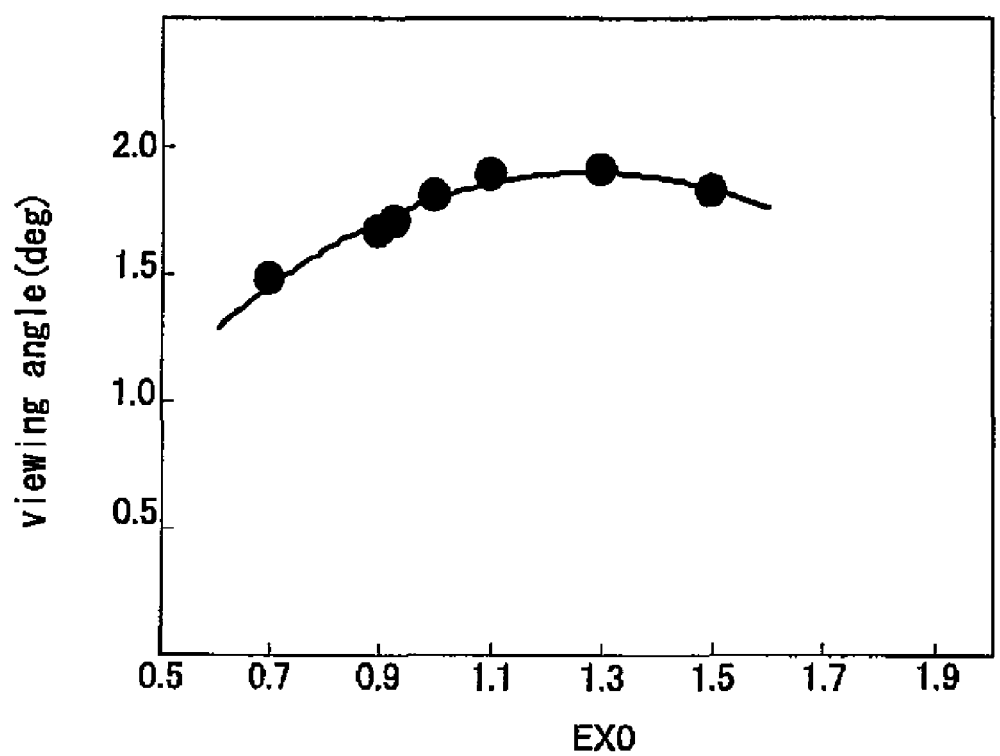
FIG. 23 shows the relation between the height of a cylindrical lens in an optical sheet according to the third embodiment and the relative brightness.

The relation between EX0 and relative brightness is given in FIG. 23. The relative brightness herein refers to a value produced as brightness at a viewing angle 0° using the optical sheet relative to brightness at a viewing angle of 0° only with the diffuser plate.

With reference to FIG. 23, when the value for EX0 was not more than 0.8, the relative brightness was not more than 1.5, which was lower than the relative brightness (about 1.5) of the prism sheet. On the other hand, when the value for EX0 exceeded 1.3, the relative brightness was higher than 1.5 though it was slightly lowered. However, when the value for EX0 exceeded 1.3, the height of the optical reflection layer increases, which makes it difficult to cure the optical reflection layer, and therefore makes it difficult to produce optical sheets.

Although the embodiments of the present invention have been described, the same is by way of illustration and example only and is not to be taken by way of limitation. The invention may be embodied in various modified forms without departing from the spirit and scope of the invention.

The invention claimed is:

1. An optical sheet for a backlight provided on a surface light source in the backlight, comprising:
   an optical reflection layer having a plurality of through grooves arranged at a prescribed interval; and
   a plurality of cylindrical lenses each provided at a corresponding through groove,
   the width of said through groove being narrowed from the upper surface to the lower surface of said optical reflection layer,
   said cylindrical lens being filled in said through groove and having a cylindrical surface on the upper surface side of said optical reflection layer, wherein
   the refractive index of said cylindrical lens is n, the radius of curvature of said cylindrical surface is r, and the height h from the top of said cylindrical lens to the opening of the through groove formed at the lower surface of said optical reflection layer satisfies the following Expression (1):

$$nr/(n-1)\times 0.8 \leq h \leq nr(n-1)\times 1.3 \qquad (1).$$

2. An optical sheet for a backlight provided on a surface light source in the backlight, comprising:
   a sheet-type optical reflection layer having a plurality of through holes; and
   a plurality of micro-lenses each provided in a corresponding through hole,
   said through hole being gradually reduced in size from the upper surface to the lower surface of said optical reflection layer,
   said micro-lens being filled in said through hole and having a spherical surface on the upper surface side of said optical reflection layer, wherein
   a cross sectional shape of each said through hole is a rectangle, and the longer sides of the cross sectional shapes of the through holes are substantially parallel to each other.

3. A backlight comprising:
   a surface light source; and
   an optical sheet provided on said surface light source, said optical sheet including an optical reflection layer having a plurality of through grooves arranged at a prescribed interval and a plurality of cylindrical lenses each provided in a corresponding through groove, the width of said through groove being narrowed from the upper surface to the lower surface of said optical reflection layer, said cylindrical lens being filled in said through groove and having a cylindrical surface on the upper surface side of said optical reflection layer, wherein
   the refractive index of said cylindrical lens is n, the radius of curvature of said cylindrical surface is r, and the height h from the top of said cylindrical lens to the opening of the through groove formed at the lower surface of said optical reflection layer satisfies the following Expression (1):

$$nr/(n-1)\times 0.8 \leq h \leq nr/(n-1)\times 1.3 \qquad (1).$$

4. A display device comprising:
   a backlight including an optical sheet and a surface light source provided with said optical sheet, said optical sheet including an optical reflection layer having a plurality of through grooves arranged at a prescribed interval and a plurality of cylindrical lenses each provided in a corresponding through groove, the width of said through groove being narrowed from the upper surface to the lower surface of said optical reflection layer, said cylindrical lens being filled in said through groove and having a cylindrical surface on the upper surface side of said optical reflection layer; and
   a liquid crystal panel provided on said backlight, wherein the refractive index of said cylindrical lens is n, the radius of curvature of said cylindrical surface is r, and the height h from the top of said cylindrical lens to the opening of the through groove formed at the lower surface of said optical reflection layer satisfies the following Expression (1):

$$nr/(n-1)\times 0.8 \leq h \leq nr/(n-1)\times 1.3 \qquad (1).$$

5. A backlight comprising:
   a surface light source; and
   an optical sheet provided on said surface light source, said optical sheet including a sheet type optical reflection layer having a plurality of through holes and a plurality of micro-lenses each provided in a corresponding through hole, said through hole being gradually reduced in size from the upper surface to the lower surface of said optical reflection layer, said micro-lens being filled in said through hole and having a spherical surface on the upper surface side of said optical reflection layer, wherein
   a cross sectional shape of each said through hole is a rectangle, and the longer sides of the cross sectional shapes of the through holes are substantially parallel to each other.

6. A display device comprising:
   a backlight including an optical sheet and a surface light source provided with said optical sheet, said optical sheet including a sheet type optical reflection layer having a plurality of through holes and a plurality of micro-lenses each provided in a corresponding through hole, said through hole being gradually reduced in size from the upper surface to the lower surface of said optical reflection layer, said micro-lens being filled in said through hole and having a spherical surface on the upper surface side of said optical reflection layer; and
   a liquid crystal panel provided on said backlight, wherein a cross sectional shape of each said through hole is a rectangle, and the longer sides of the cross sectional shapes of the through holes are substantially parallel to each other.

* * * * *